United States Patent [19]

Miller et al.

[11] Patent Number: 5,287,447
[45] Date of Patent: Feb. 15, 1994

[54] METHOD AND SYSTEM FOR PROVIDING CONTAINER OBJECT ATTRIBUTES TO A NON-CONTAINER OBJECT

[75] Inventors: Patrice R. Miller; Wade A. Miller, both of Keller; John K. Rayborn, Dallas, all of Tex.

[73] Assignee: International Business Machines Corporation, Armonk, N.Y.

[21] Appl. No.: 723,086

[22] Filed: Jun. 28, 1991

[51] Int. Cl.$^5$ ............................................. G06F 15/62
[52] U.S. Cl. ...................................... 395/157; 395/159
[58] Field of Search ............................... 395/155–161, 395/145–149, 600, 154, 200, 700, 133, 135; 340/721, 703, 706, 747, 723, 709, 710

[56] References Cited

U.S. PATENT DOCUMENTS

| | | | |
|---|---|---|---|
| 4,723,209 | 2/1988 | Hernandez et al. | 395/147 |
| 4,739,477 | 4/1988 | Barker et al. | 395/600 |
| 4,815,029 | 3/1989 | Barker et al. | 395/146 |
| 4,899,136 | 2/1990 | Beard et al. | 340/721 X |
| 4,982,344 | 1/1993 | Jordan | 395/157 |
| 5,185,885 | 2/1993 | Dysart et al. | 395/600 |

OTHER PUBLICATIONS

Hurwitz, "Office Vision", Patricia Seybold's Office Computing Report, Oct. 1989, (full text) p. 1(12).
Rymer, "Distributed Object Management", Patricia Seybold's Office Computing Report, Jul. 1989, (full text), p. 1(13).
"Display Ad Systems", Patricia Seybold's Office Computing Report, Jul. 19, 1989, (full text), p. 31(8).
Taft, "USPA's Already Trying Out HP's New Wave Office", Gov. Comp. News, Dec. 11, 1989, p. 3(1).
Macintosh System Software User's Guide, vol. 6.0, Apple Computer, Inc., 1988, pp. 14–43, 148–150.

*Primary Examiner*—Heather R. Herndon
*Assistant Examiner*—John E. Breene
*Attorney, Agent, or Firm*—Duke W. Yee; Andrew J. Dillon

[57] ABSTRACT

The method and apparatus of the present invention includes a method for providing a non-container object with the appearance of container object attributes in a graphic user interface operating environment. This method and apparatus includes creating a container manager and associating the container manager with the non-container object. A container pane is created and associated with the container manager. This container pane is in communication with the container manager and a list control in the graphic user interface operating environment. The container pane in the container manager both interact to provide the non-container object with the appearance of the container object attributes. If an item is present in the non-container object when the non-container object is started, a contained object is created for the item to be displayed within the non-container object. Next, if an item is added to the non-container object, a contained object is created for the item to be displayed within the non-container object. When an item is removed from the non-container object, the contained object for the item is deleted. When a contained object is present, the container manager is provided control over the display manipulation of the contained object while that contained object is within the non-container object. Moreover, the container pane graphically displays an icon that represents the contained object in a window. The container pane also relays input by a user to the container manager.

9 Claims, 8 Drawing Sheets

METHOD AND SYSTEM FOR PROVIDING CONTAINER OBJECT ATTRIBUTES TO A NON-CONTAINER OBJECT

BACKGROUND OF THE INVENTION

1. Field of the Invention

The present invention relates in general to an object-oriented development tool kit component for aiding in developing applications for use with a graphic user interface operating environment that is operating in a nonobject-oriented environment, and in particular to a method for a container object management system for use with the graphic user interface operating environment outside of the object-oriented environment. Still more particularly, the present invention relates to a container management system for use with a graphic user interface operating environment outside of the object-oriented environment that provides non-container objects with container-like properties.

2. Description of the Prior Art

Object-oriented languages confer the benefits of extendibility and reusable code, but in an object-oriented environment, situations exist in which operations such as accessing data outside the environment, sending information outside of the environment, or other programming calls to applications or operating systems outside of the environment may be desirable. At this point in time, graphic user interface operating environments not in an object-oriented environment are being developed in which application developers desire to create applications for use with these operating environments. In some situations, an application developer may be programming in an object-oriented language. In such a case, it is necessary to perform operations both inside and outside the object-oriented environment. One operating environment is an end user interface which is an operating environment using the methodology, including devices, by which an end user interacts with the operating environment, an application in the environment. A graphic user interface ("GUI") operating environment is an end user environment that is graphical. For example, the end user interacts with the environment via windows, icons, menus, pointing devices, etc.

Presently, persons writing applications in an object-oriented language for GUI operating environments must include in their applications C code and/or application programming interface ("API") calls. The use of C language or API calls and the retraining issues for programmers and developers trained in object-oriented languages are extremely costly.

Applications may be built using objects. In an object-oriented environment, an object consists of related pieces of code and data. An object has a library of methods which are essentially unique to an object giving the object its specific behaviors. The class of an object defines a grouping based on one or more properties, and an instance as a single item in a class. For example, a class of an object could be considered as analogous to professions, i.e., lawyers, doctors, engineers, and programmers, with an instance of an object being analogous to a particular individual in a class.

A class defines methods for constructing new instances and also instance methods which define how an instance behaves and reacts to incoming messages. The instance variables define the particular features of an instance object such as an individual's salary. The instance variables may be defined or may be empty awaiting definition. An instance's data structure is described by its collection of instance variables. Applications in object-oriented environments may be divided into three basic components: models, view, and controllers. Model objects are the components of the application that does the work; i.e., manipulate data. Next, view objects handle all graphical aspects; i.e., screen presentation. The controller objects make up the interface between model objects, view objects, and input devices (e.g., keyboard or pointing device). In other words, the controller objects deals with user input device interactions.

Some GUI operating environments, such as OfficeVision/2, a product of International Business Machines Corporation, are not created using an object-oriented language. Presently in such a situation, the only development option available to developers for creating applications for use with such an operating environment has been to create applications using C language, Presentation Manager, and OfficeVision/2 API's.

Presently, GUI operating environments such as OfficeVision/2 contain classes of objects: container objects, device objects, and data objects. Container objects include things such as folders, drawers, and file cabinets in a GUI operating environment, while devices include, for example, printers, facsimiles, and shredders. Data objects are anything that is neither a container object nor a device object. Some examples of data objects include a document such as a letter or illustrative memo, or a spreadsheet such as a monthly budget. The data objects include the application running the object. For example, a memo would include the word processor used to edit or create the memo. The focus on the data object, as opposed to the application, is to direct the users attention to the memo and not the word processor.

Currently, devices and data objects do not have manipulative characteristics such as dragging an icon from one container to another and dropping it into the new container. That is, within a data object icons are not associated with their files for manipulation.

For example, a user of a business planning memo might have spreadsheets or other memos related to the business planning memo. The user would not be able to see iconic representations of the related memos or spreadsheets and manipulate them as in a container object. Thus, it would be desirable to have a system that would provide non-container objects with container-like properties.

SUMMARY OF THE INVENTION

It is therefore one object of the present invention to provide an object-oriented development tool kit component for aiding in developing applications for use with a GUI operating environment that is operating in a nonobject-oriented environment.

It is another object of the present invention to provide a container object management system for use with a GUI operating environment outside of the object-oriented environment.

It is yet another object of the present invention to provide a container object management system for use with a GUI operating environment outside of the object-oriented environment that provides non-container objects with container-like properties.

The method and apparatus of the present invention includes a method for providing a non-container object with the appearance of container object attributes in a graphic user interface operating environment. This method and apparatus includes creating a container manager and associating the container manager with the non-container object. A container pane is created and associated with the container manager. This container pane is in communication with the container manager and a list control in the graphic user interface operating environment. The container pane and the container manager both interact to provide the non-container object with the appearance of the container object attributes.

If an item is present in the non-container object when the non-container object is started, a contained object is created for the item to be displayed within the non-container object. Next, if an item is added to the non-container object, a contained object is created for the item to be displayed within the non-container object. When an item is removed from the non-container object, the contained object for the item is deleted.

When a contained object is present, the container manager is provided control over the display and manipulation of the contained object while that contained object is within the non-container object. Moreover, the container pane graphically displays an icon that represents the contained object in a window. The container pane also relays input by a user to the container manager.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
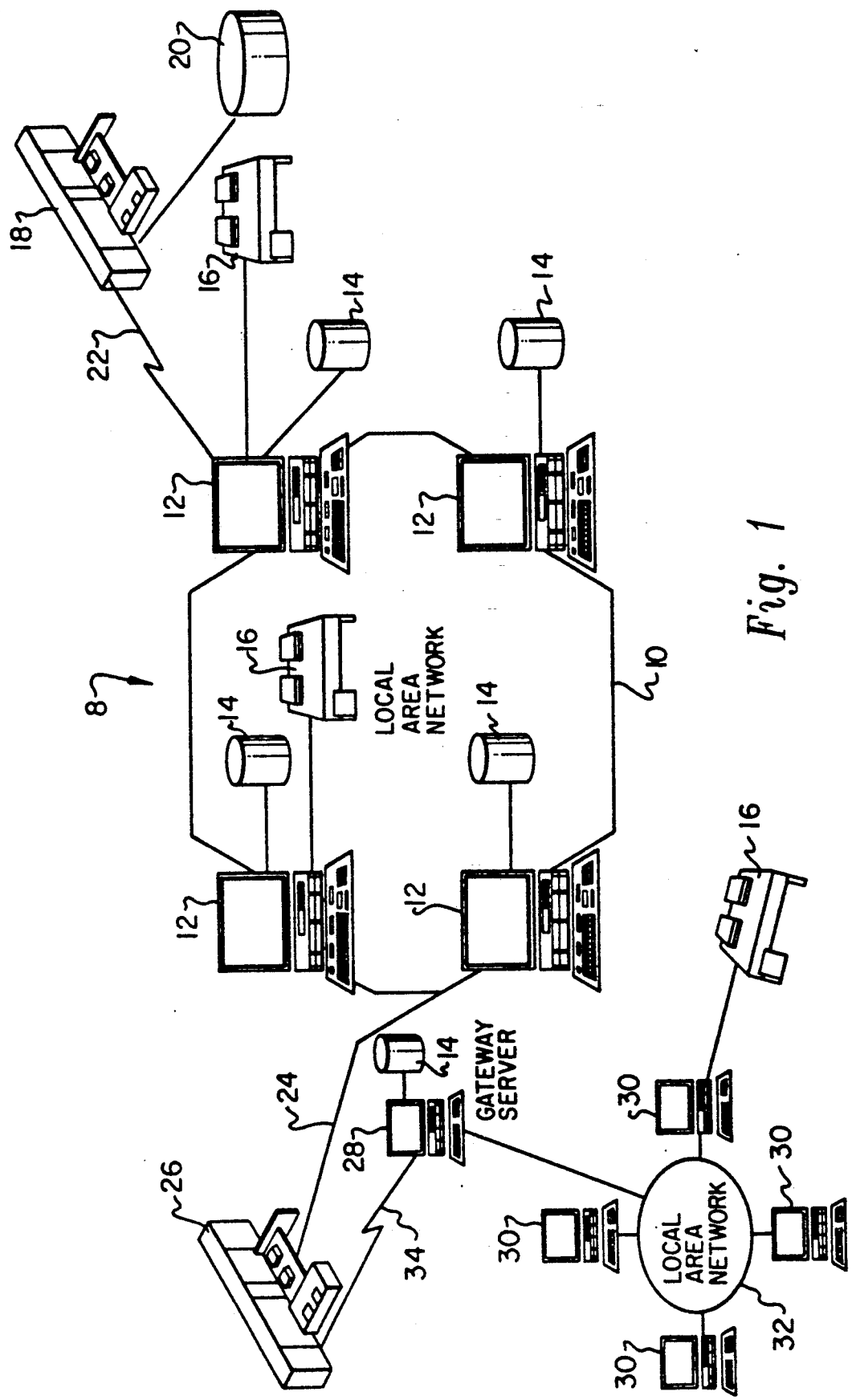
FIG. 1 depicts a pictorial representation of a distributed data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing network 8 may also include multiple mainframe computers, such as mainframe computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by main frame computer 18, as Resource Manager or Library Service for the resource objects thus stored. Of course., those skilled in the art will appreciate that main frame computer 18 may be located a great geographic distance from Local Area Network (LAN) 10 and similarly Local Area Network (LAN) 10 may be located a substantial distance from Local Area Network (LAN) 32. For example, Local Area Network (LAN) 32 may be located in California while Local Area Network (LAN) 10 may be located within Texas and main frame computer 18 may be located in New York.

A GUI operating environment may be found on individual computers 12 and 30, on gateway server 28, on some computer in LAN 10 or 32, or on mainframe computer 18. Individuals may use a GUI operating environment as a stand alone on their individual computers or may use a GUI operating environment as a user on a LAN.

Various GUI operating systems and object-oriented environments may be used. One such GUI operating environment which would be suitable f or use with a preferred embodiment of the present invention is OfficeVision/2, a product of International Business machines corporation. Smalltalk/V PM, a product of Digitalk, Inc., is an object-oriented environment used in a preferred embodiment of the invention.

A container object in OfficeVision/2 is represented to the user as an icon (a visual picture representing the object) on the OfficeVision/2 desktop. Containers usually display a list of objects using a combination of text and icons. The icon for a container object may represent an in-basket (containing documents) or a folder or a file cabinet (contains drawers). OfficeVision/2 container objects have specific characteristics and may perform only certain types of actions. The following is a list of characteristics and actions provided:

1. Copy the selected object to or from an OfficeVision/2 container based on the options chosen.
2. Discard the selected object from an OfficeVision/2 container based on the options chosen.
3. Move the selected object to or from an OfficeVision/2 container based on the options chosen.
4. Open the selected object to or from an OfficeVision/2 container based on the options chosen.
5. Print the selected object to or from the Officevision/2 container based on the options chosen.
6. Send the selected object to or from an OfficeVision/2 container based on the options chosen.
7. Rename the selected object in an OfficeVision/2 container based on the options chosen.
10. The container object also has the ability to be opened on a specific OS/2 subdirectory.
11. The view of contents can change to mini icons with associated text when viewing the contents of an OfficeVision/2 container.
12. The view of contents can also change to a detailed view composed of mini icons and/or text; the format is chosen by the user.

A container object in an object-oriented environment is provided with OfficeVision/2 functions that do not have to be programmed by an object-oriented developer who wants to create an OfficeVision/2 desktop interactive container object. A container object in an object-oriented environment is a class containing methods to build a container such as a drawer or folder. A container object includes a container manager to handle the container functionality of the window and aid in presenting the list of contained objects in a graphical format. A container object also provides a framework for applications that are containers.

Also included in this container object management system is a container pane which is an object-oriented interface to a graphical list control. The list control presents the list of items it contains in an iconic format for use in a graphical user interface. The container pane allows object-oriented applications to use the list control from the object-oriented environment without understanding the procedural methods implemented in the GUI operating environment. The graphical list control is able to present itself in different view formats. Container manager and container pane both form the container object.

A contained object represents an object in a container. The contained object is represented graphically in the container pane by an icon and text. Each contained object has data storage for the data needed in each view format, as well as sort information. Any action performed on the object in the container is forwarded to the contained object for processing. For example, when a user opens an object by selecting it using a pointer, the contained object gets the open message and launches the application needed to open the object. In another example, when the user drags an object into the container object and drags it over a contained object, the contained object gets a drag over notification and determines if the object being dragged can be dropped on the contained object.

The container manager is an object that allows a developer using the object-oriented tool kit to provide the end user with container functions in any type of application requiring this functionality. The container manager performs container functions such as populating the container pane, copying and moving contained objects to other containers and handling drag and drop operations.

One feature of the present invention is to provide non-container objects with the appearance of container object attributes. The combination of the container manager and the container pane with a non-container object such as a data object or a device object provides the appearance of container object-like attributes to the non-container object.

Figure 2:
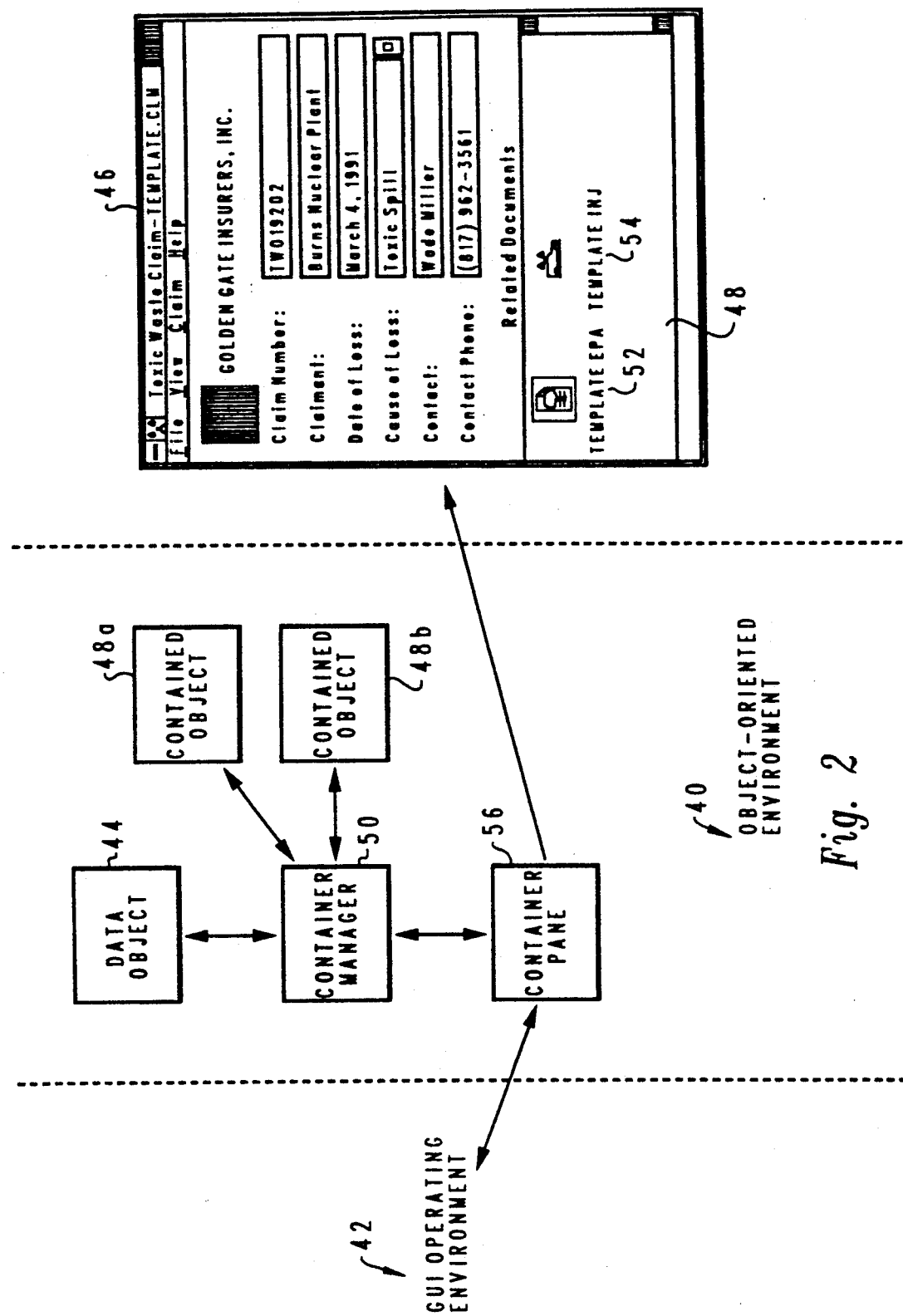
FIG. 2 is a diagram depicting a method of providing a non-container object with the appearance of attributes of a container object in accordance with a preferred embodiment of the present invention.

Referring now to FIG. 2, a diagram depicting a method of providing a non-container object with the appearance of attributes of a container object in accordance with a preferred embodiment of the present invention is depicted. As illustrated, a distributed data processing system 8 is depicted as including an object-oriented environment 40 and a GUI operating environment 42.

The container object management system includes an application which may be a data object or a device object. In this particular example, the application is a data object 44 entitled *Toxic Waste Claim Containing Information About an Insurance Claim*. Data object 44 is represented on a video display terminal as a window 46. At the bottom of window 46 is a graphical representation of contained objects 48a, 48b as icons 52, 54. Container manager 50 allows for the dragging and dropping of contained objects 48a and 48b with other objects outside of data object 44. Container object 48 may have objects dragged to and from it, so container manager 50 must be able to handle all of the interaction.

Presently, other standard data objects use lists of icons, but to this unique way of including a container within data object 44 as represented graphically in window 46 allows for more interaction with the object-oriented environment. All of this graphical presentation to the user is done by container pane 56.

The container pane 56 is visually represented to the user as a window in OfficeVision/2. The container pane may contain OfficeVision/2 objects as well as other containers. The container pane 56 contains the characteristics and functions used in a window representing a container in OfficeVision/2. The methods written specifically for a container pane object in an object oriented environment give applications the ability to perform the following functions:

1. Add—adds an OfficeVision/2 object to the container pane parameters.
2. Find—ability to locate an object in the container pane based on the parameters entered.
3. Sum—ability to display a portion of the contained objects that match the specified name or class.

4. Sort—ability to display contained objects in ascending or descending formats.

5. Mini-icons—displays objects with small icons in a list format.

6. Details displays objects with detail information.

7. Icons—displays objects with an icon format.

8. All—displays all objects in the container.

The container pane in conjunction with a container manager in the object-oriented environment allows object-oriented developers to create a window in a non-container object containing contained objects that can be moved and manipulated outside of a non-container in OfficeVision/2 without having to program the functions necessary to integrate an application into OfficeVision/2.

The container manager in an object-oriented environment provides container applications the ability to perform the following functions found in OfficeVision/2:

1. AddObject—adds an object to the container pane.

2. ContainerCopy—ability to copy a contained object to another container.

3. ContainerMove—ability to move a contained object to another container.

4. DefaultDetailsInfo—default code to display contained objects in detail format.

5. Drag—handles an object being dragged within the pane or over the pane.

6. Drop—handles an object being dropped on an object within the pane or a new object being dropped on the pane.

7. ObjectDoubleClicked—handles a contained object being doubleclicked.

8. Refresh—refresh the display of contained objects.

9. Remove—remove a contained object from the container pane.

10. Rename—rename a contained object to a new name.

Drag involves direct manipulation of objects. In OfficeVision/2 using mouse button 2, an object can be "picked up" and moved around the screen by holding down mouse button 2. When a drag is occurring and mouse button 2 is released the object being dragged is considered dropped. The object that was underneath the dragged object then receives a dropped on message for processing.

Referring back to FIG. 2, data object 44 creates container manager So which is associated with and in communication with data object 44. Data object 44 also creates container pane 56 which is associated with and in communication with container manager 56. Container pane 56 is also in communication with a list contact located in OfficeVision/2 and receives input from a user using various pointing devices such as a mouse or a light pen.

The term containers is used to refer to container objects and non-container objects having the appearance of container object attributes.

Figure 3:
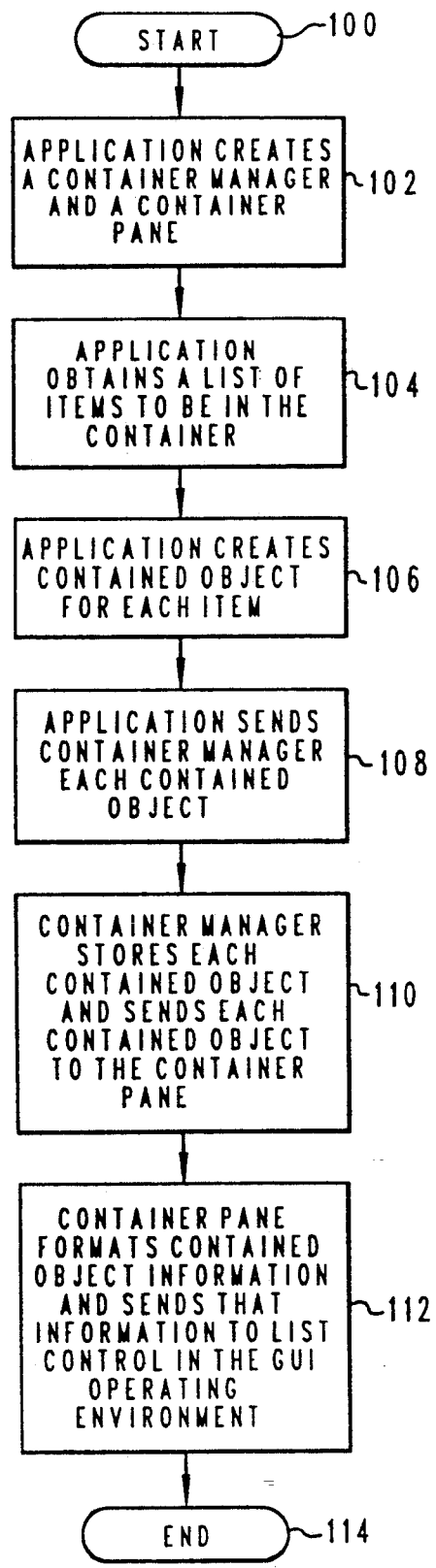
FIG. 3 depicts a high level flowchart of a method of populating containers in a preferred embodiment of the present invention.

FIG. 3 depicts a high level flowchart of a method for populating containers in a preferred embodiment of the present invention. As illustrated, the process begins at block 100 and thereafter passes to block 102 which illustrates an application creating a container manager and a container pane. Next, block 104 shows the application obtaining a list of items to be in the container. Block 106 illustrates the application creating a contained object for each item. Thereafter, block 108 shows the application sending the container manager each contained object. The process proceeds to block 110 which illustrates the container manager storing each contained object and then sending each contained object to the container pane. Block 112 shows the container pane formatting container object information and sending that information to the list control, which is located in the GUI operating environment. More specifically the information on an item found in the contained object is placed into a C structure and sent to the GUI operating environment using API calls.

Figure 4:
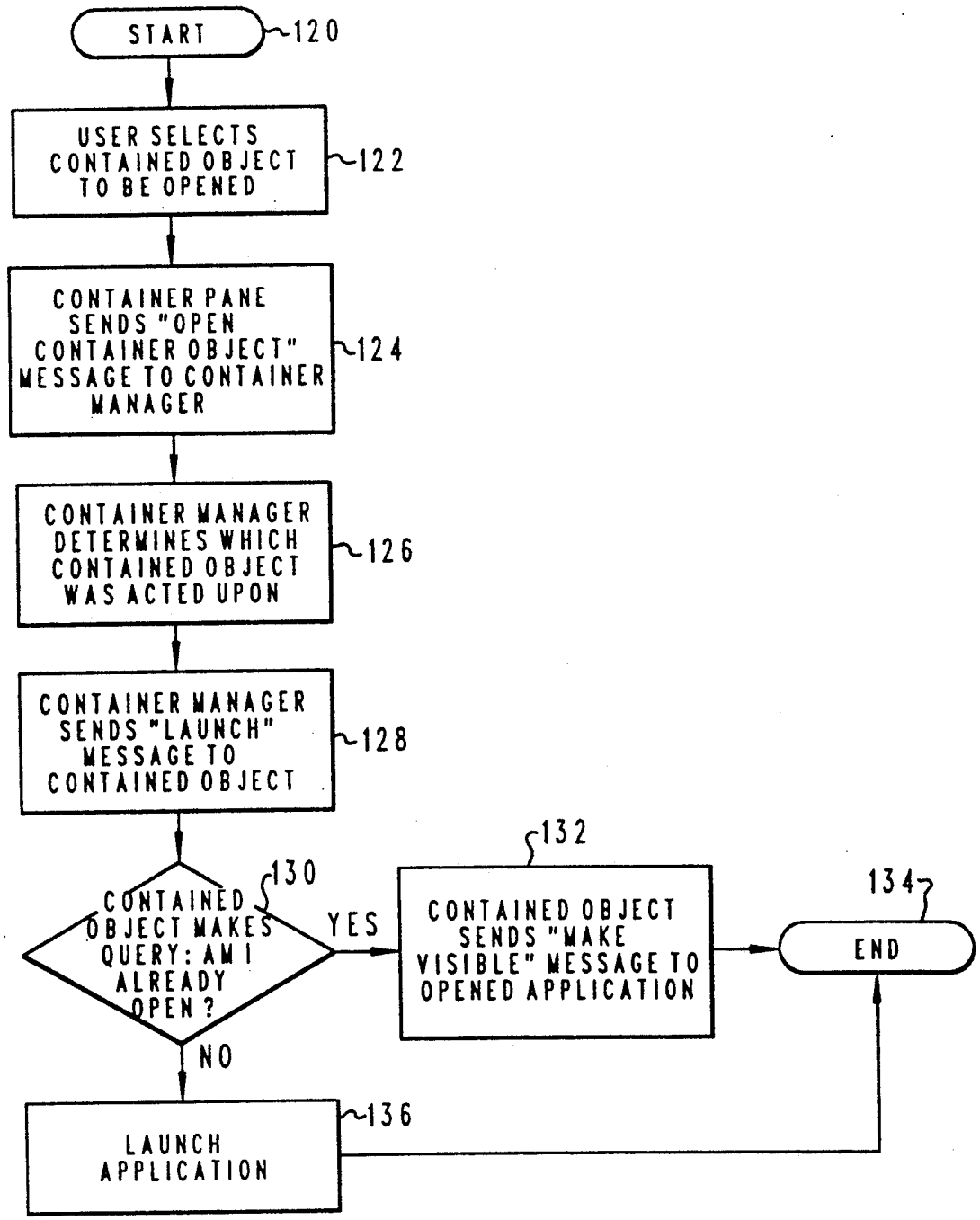
FIG. 4 is a high level flowchart depicting a method for the selection of a contained object to be opened under a preferred embodiment of the present invention.

FIG. 4 is a high level flowchart depicting a method for the selection of a contained object to be opened under a preferred embodiment of the present invention. As illustrated, the process begins at block 120 and thereafter passes to block 122 which illustrates a user selecting a contained object to be opened. Selection of a contained object may be accomplished using a pointer such as a cursor, a mouse, or a light pen. Next, block 124 shows the container pane sending an "open contained object" message to container manager. Block 126 illustrates the container manager determining which contained object was acted upon through the user's selection. The process then proceeds to block 128 which shows container manager sending a "launch" message to the contained object. A launch occurs when an object is opened; the application responsible for opening it is launched or run.

Next, contained object makes a query: "Am I already open?" as illustrated in block 130. I f the object is already open, the process then proceeds to block 132 which shows container object sending a "make visible" message to opened application. Thereafter, the process terminates in block 134. When the contained object is already open, the "make visible" message is used to bring what ever window the contained object is in to the top of any windows that might be open.

Referring again to block 130, in the event the query results in a determination that the object is not open, the process then proceeds to block 136 which illustrates the launching of the application. Thereafter, the process terminates in block 134.

Figure 5:
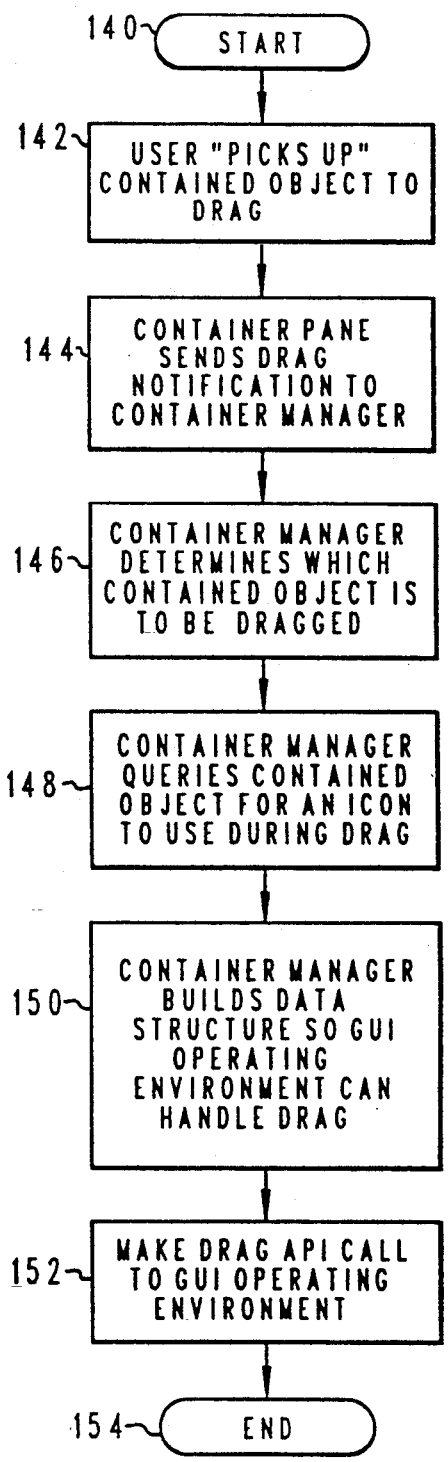
FIG. 5 depicts a high level flowchart of a method for selecting an object and picking it up to drag that object from its position in accordance with a preferred embodiment of the present invention.

FIG. 5 depicts a high level flowchart of a method for selecting an object and picking up an object to drag that object from its position in accordance with a preferred embodiment of the invention. The process begins in block 140 and continues to block 142, which shows the user selecting or picking up a contained object in order to drag or move the object. Next, block 144 illustrates the container pane sending a "drag" notification to the container manager. The process then proceeds to block 146, showing container manager determining which contained object is to be dragged. Next,, container manager queries contained object for an icon to use during drag as illustrated in block 148. Thereafter, block 150 shows container manager building a data structure to enable the GUI operating environment to handle the drag. The data structure is a C structure that can be sent to the GUI operating environment. The process then proceeds to block 152 which illustrates making a drag API call to the GUI operating environment. Thereafter, the process terminates in block 154.

Figure 6:
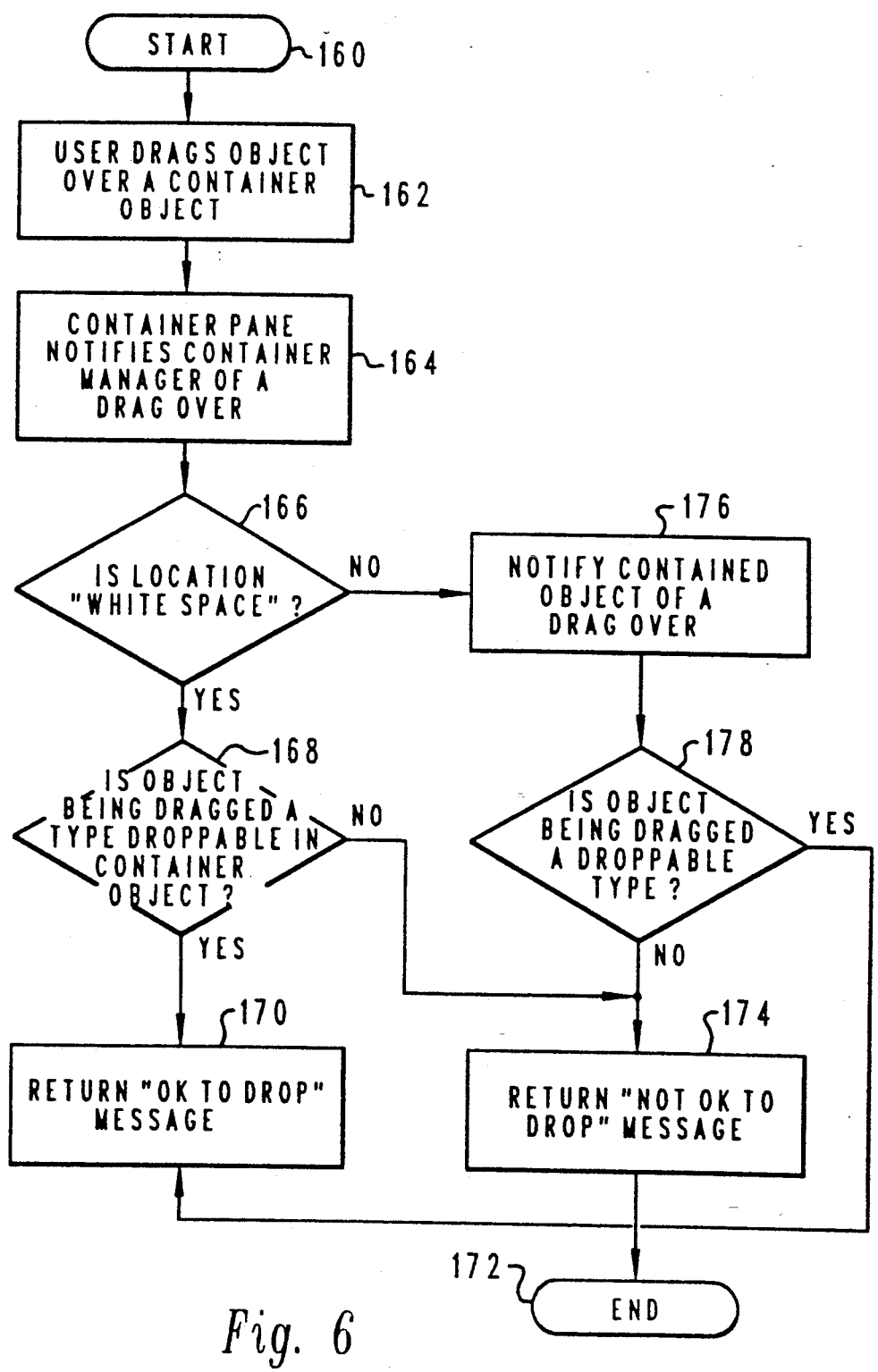
FIG. 6 is a high level flowchart depicting a method for dragging an object over a container other than the container that the object originated from of under a preferred embodiment of the present invention.

FIG. 6 is a high level flowchart of a method depicting a method for dragging an object over a container other than the container that the object originated from. As illustrated, the process begins at block 160 and thereafter passes to block 162 which illustrates the user dragging an object over a container. The container may be a traditional container or a non-container object having the appearance of container attributes. Next, block 164 shows container pane notifying container manager of a drag over. Drag over occurs as an object is being dragged, it can pass over other objects. As an object is being passed over, it receives a drag over message and determines if the object is droppable.

Next, a determination is made by the container manager of the container over which the object is being dragged, as to whether the location is another contained object or "white space" as illustrated in block 166. White space is an area of a container not currently occupied by a contained object. If the location is "white space", a determination is made as to whether the object being dragged is a type droppable on the white space as illustrated in block 168. To determine if an object is a droppable type, its type (or class) must be checked. For example, a phone device would only accept a drop of an object of type "address book entry." If the object being dragged is a type droppable in white space an "OK to drop" message is returned as illustrated in block 170. Thereafter, the process terminates in block 172.

Referring again to block 168, if the object is not of a type droppable in white space, a "not OK to drop" message is returned and thereafter the process terminates in block 172.

Referring back to block 166, if the location is another contained object, the process then proceeds to block 176 which illustrates notification of the contained object of a drag over. Next, the process proceeds to block 178 which shows a determination made by the contained object as to whether the contained object being dragged is of a droppable type. If the object being dragged is of a droppable type an "OK to drop" message is returned as illustrated in block 170 and the process terminates in block 172. If, however, the object being dragged is not determined to be of a droppable type as illustrated in block 178, the process then proceeds to block 174 which shows returning a "not OK to drop" message. Thereafter, the process terminates in block 172.

Figure 7:
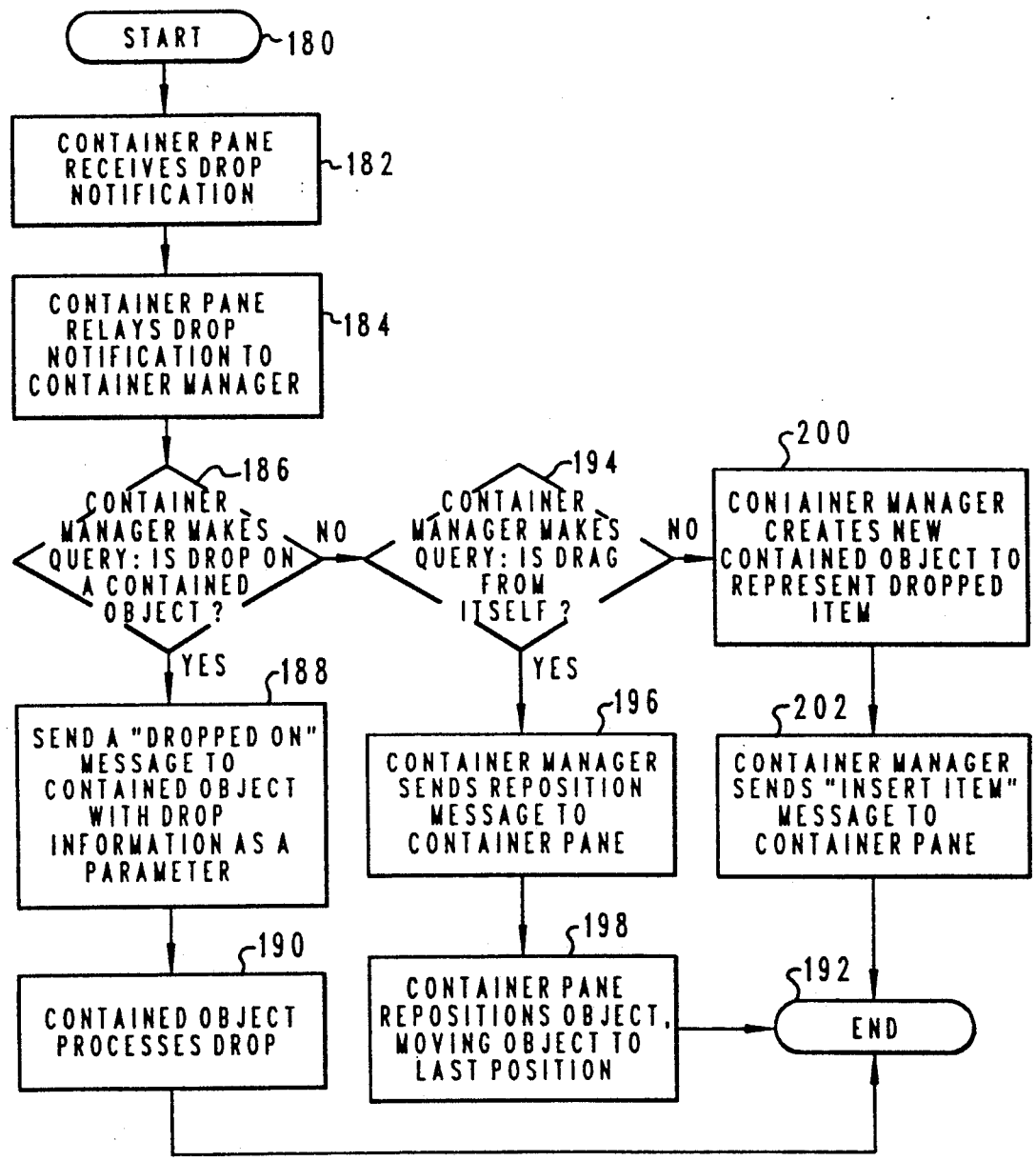
FIG. 7 depicts a high level flowchart of a method for handling a drop in a container in accordance with a preferred embodiment of the present invention.

FIG. 7 depicts a high level flowchart of a method for handling a drop in a container in accordance with a preferred embodiment of the present invention. As illustrated, the process begins at block 180 and thereafter proceeds to block 182 which shows container pane receiving a drop notification. Next, block 184 illustrates container pane relaying drop notification to container manager. The process then proceeds to block 186 wherein a query made by container manager is illustrated as to whether the drop is on a contained object. If the drop is on a contained object, the process then proceeds to block 188 which illustrates sending a "dropped on" message to contained object with drop information as a parameter.

Thereafter, the process proceeds to block 190 shows contained object processing the drop with the process terminating thereafter in block 192. Referring again to block 186 if the drop is not on a contained object, the process proceeds to block 194 illustrating container manager making a query as to whether the drag originated from itself. If the drag originated from itself, the process then proceeds to block 196 showing container manager sending a repositioned message to container pane. Next, block 198 illustrates container pane repositioning the object, moving the object to the last position. Thereafter, the process terminates in block 192.

Referring again to block 194, if the container manager determines the drag did not originate from itself, the process proceeds to block 200 showing container manager creating a new contained object to represent the dropped item. Container manager then sends a "insert item" message to container pane as illustrated in block 202. Afterwards, the process terminates in block 192.

Figure 8:
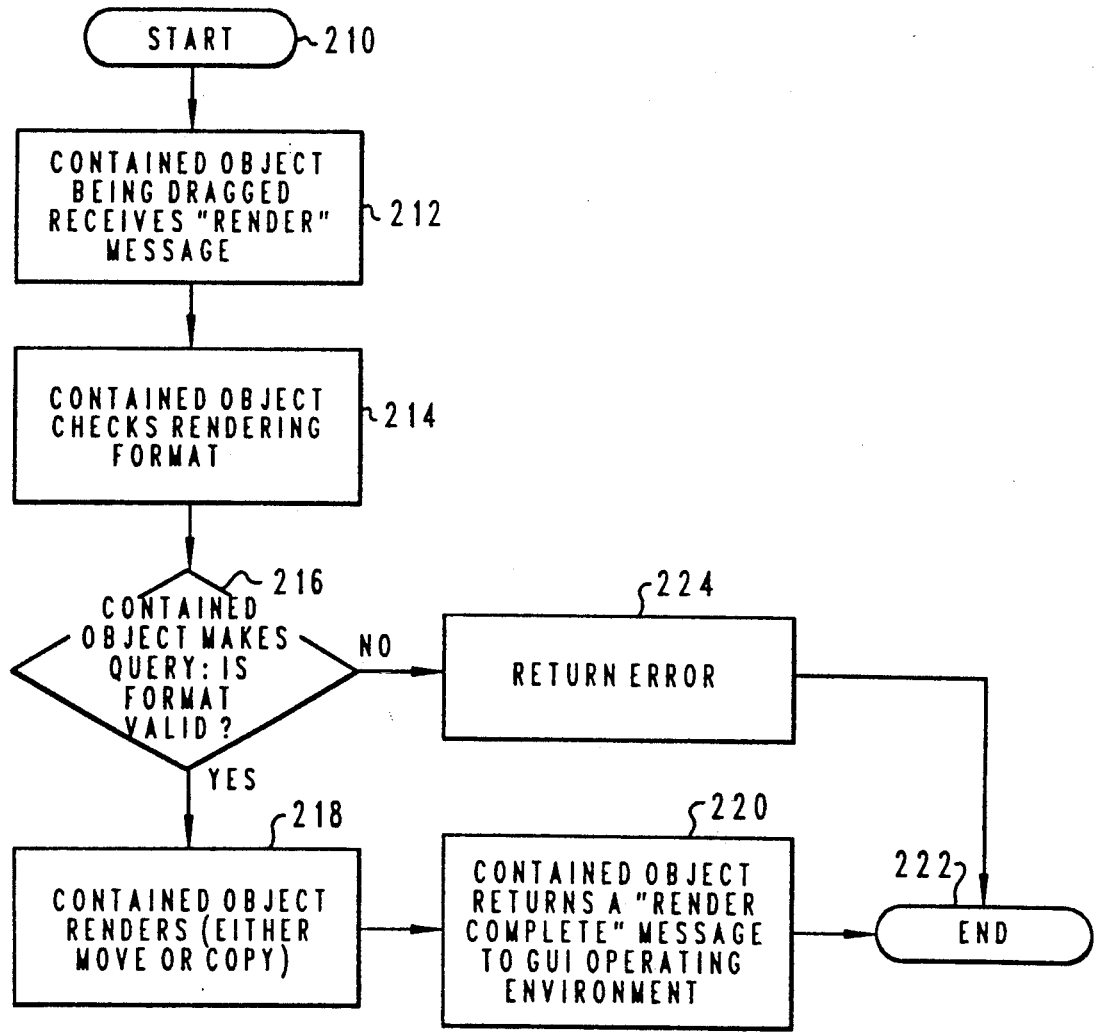
FIG. 8 is a high level flowchart depicting a method for dropping a contained object in a container other than the contained object's originating container under a preferred embodiment of the present invention.

FIG. 8 is a high level flowchart depicting a method for dropping a contained object in a container other than the contained object's originating container. That is the contained object is removed from its original container. This figure illustrates the original container's view of the process. As illustrated, the process begins in block 210 and thereafter proceeds to block 212 which illustrates the contained object being dragged receiving a "render" message. This message is a command to the contained object to move or copy itself to another location. This moving or copying may involve moving or copying data to memory or moving or copying a file to another location on a mass storage unit.

Next, block 214 shows contained object checking rendering format and location. Rendering occurs after a drop. If data is to be exchanged between the dragged object and the dropped on object, a format must be agreed to. This format can be text, bitmap, OS/2 file or some other format. The process then proceeds to block 216 which illustrates a determination made by the contained object as to whether the format is valid. If the format is valid, the contained object renders; that is either move or copy itself as illustrated in block 218. Next, block 220 illustrates the contained object returning a "render complete" message to the GUI operating environment. Thereafter the process terminates in block 222.

Referring again to block 216, if a determination is made that the format is not valid a message that an error has occurred is returned as shown in block 224. Thereafter, the process terminates in block 222.

Figure 9:
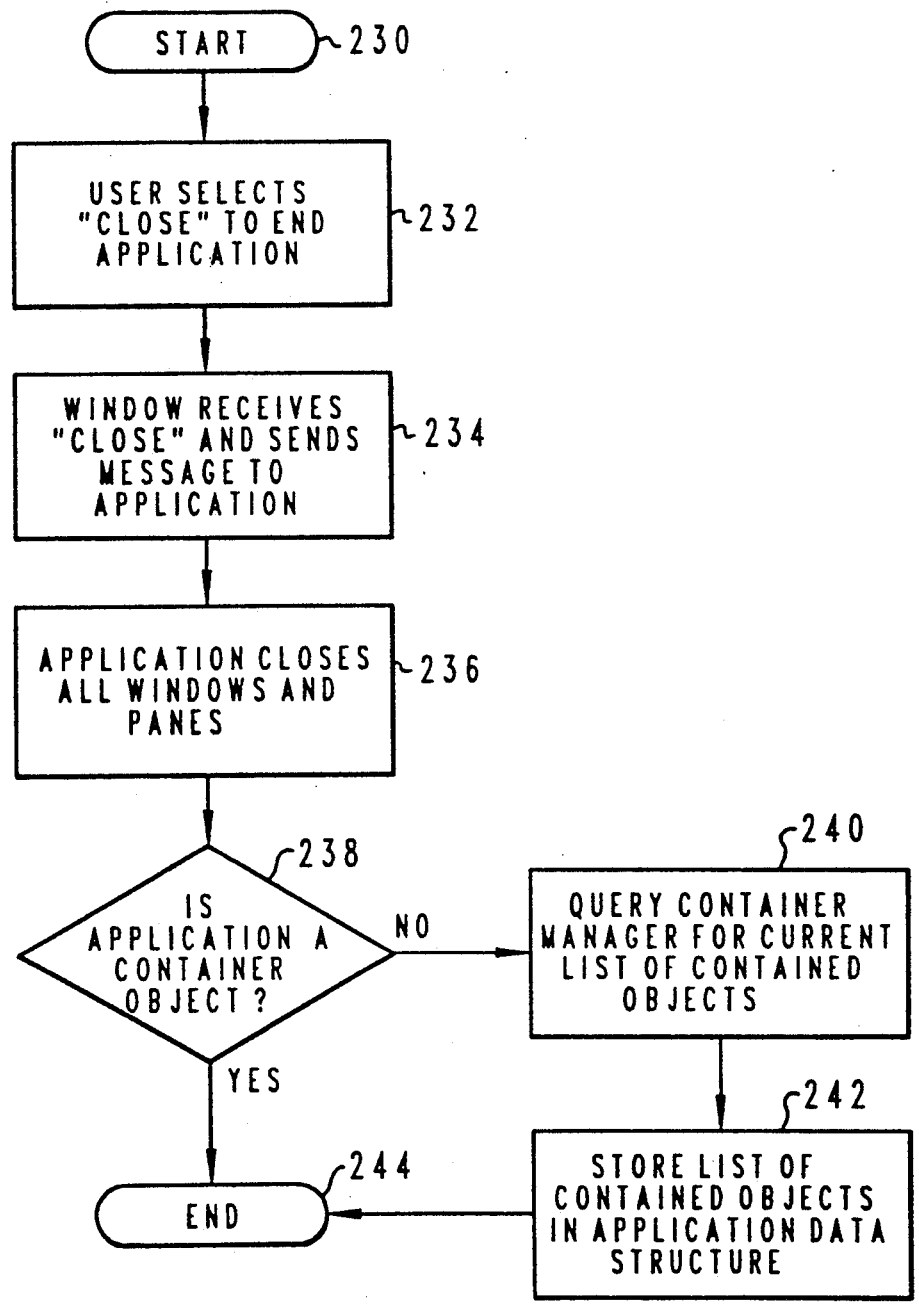
FIG. 9 depicts a high level flowchart of a method for closing an application having the appearance of container-like attributes under a preferred embodiment of the present invention.

FIG. 9 depicts a high level flowchart of a method for closing an application having the appearance of container-like attributes under a preferred embodiment of the present invention. As illustrated, the process begins at block 230 and thereafter passes to block 232 which illustrates the user selecting a "close" option to end an application. Next, block 234 shows a window receiving the "close" selection and sending the message to the application. Block 236 illustrates the application closing all windows and panes. Thereafter, the process proceeds to block 238 which shows deciding whether the application is a container object.

If the application is not a container object, the process then proceeds to block 240 which illustrates querying the container manager for a current list of contained objects. Afterwards, block 242 shows storing a list of contained objects in the application data structure. Thereafter, the process terminates in block 244. Referring back to block 238, if the application is a container object, the process proceeds to block 244 and terminates.

The description of the steps in the present invention may be provided as a tool kit component for aiding and developing applications for use with GUI operating environments. In another embodiment, the methods of the present invention may be implemented into a computer program for integrating object-oriented programs with GUI operating environment by providing the appearance of container attributes to non-container objects.

The following is an example of pseudo code that would be used for populating an application (App A)

having the appearance of container attributes with contained objects.

| App A: | Create instance of container manager. |
| --- | --- |
| | Create instance of container pane. |
| | Build list of item to be in container pane. |
| | Create a contained object to represent each item in the list. |
| | Send each contained object to container manager. |
| Container Manager: | Store each contained object. |
| | Send each contained object to container pane. |
| Container Pane: | Format information for each contained object. |
| | Send formatted information to list control. |
| List Control: | Display each item in window. |

The following is an example of pseudo code used to close App A from the prior example of pseudo code for populating an application.

| App A Window: | Receives close message from system. |
| --- | --- |
| | Forward close message to application. |
| App A: | Sends close window message to application window. |
| | Send close window message to all panes. |
| | Is App A A Container Object? |
| If True: | App A ends processing |
| If False: | App A queries container manager for current list of contained objects. |
| | Store list of contained objects in application data storage. |
| | End processing. |

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method in an object-oriented environment for providing a non-container object with an appearance of container object attributes in a graphic user interface operating environment comprising:

creating a container manager and associating said container manager with said non-container object in the object oriented environment;

creating a container pane and associating said container pane with said container manager, said container pane in communication with said container manager and a list control in said graphic user interface operating environment, and said container pane and said container manager providing the appearance of container object attributes to said non-container object;

if an item is present in said non-container object, creating a contained object, for said item, to be displayed within said non-container object;

if an item is added to said non-container object, creating a contained object, for said item, to be displayed within said non-container object;

if an item is removed from said non-container object, deleting said contained object for said item;

if a contained object is present, providing said container manager control over display and manipulation of said contained object while said contained object is within said non-container object; and if a contained object is present is said non-container object, displaying within said non-container object an icon representing said contained object, said container pane displaying said icon within said non-container object in a window and relaying an input entered by a user to said container manager, wherein said non-container object may be provided container object attributes.

2. The method of claim 1, wherein a presence of an item is initially determined when an application is started by querying a list of items associated with said application.

3. The method of claim 1, further if an application is being closed, querying said container manager for a list of contained objects and storing said list for use next time said application is started.

4. The method of claim 1, wherein said input comprises selecting said contained object for repositioning in a container.

5. The method of claim 1, wherein said input comprises selecting and opening said contained object.

6. A data processing system using a graphic user interface operating environment for providing a non-container object with an appearance of a container object comprising:

a container manager, said container manager associated with said non-container object in an object-oriented environment; and a container pane, said container pane associated with said container manager, in communication with said container manager and a list control in said graphic user interface operating environment, and displaying within said non-container object an area with container object attributes and relaying user input to said container manager, said container pane and said container manager providing said non-container object with the appearance of said container object.

7. The system of claim 6, wherein said container pane controls a display through an interface with a list control.

8. The system of claim 7, wherein said interface includes application program interface calls specific to said graphic user interface operating environment.

9. The system of claim 8, wherein said system is implemented as a tool kit component for use in developing object-oriented applications for use with said graphic user interface operating environment.

* * * * *